United States Patent [19]

Belloche

[11] Patent Number: 4,618,031

[45] Date of Patent: Oct. 21, 1986

[54] INSTALLATION AND METHOD FOR SUPPLYING MERCHANDISE TO SALES DISPLAY STRUCTURES

[76] Inventor: Alain Belloche, 9, avenue du Mail, 35000 Rennes, France

[21] Appl. No.: 687,477

[22] Filed: Dec. 28, 1984

[30] Foreign Application Priority Data

Jan. 4, 1984 [FR] France .................................. 84 00136

[51] Int. Cl.$^4$ .............................................. A47F 10/02
[52] U.S. Cl. ....................................... 186/52; 414/281
[58] Field of Search ................................ 186/52–57, 186/35, 36, 69; 414/266, 276, 277, 279, 281, 786

[56] References Cited

U.S. PATENT DOCUMENTS

| | | | |
|---|---|---|---|
| 1,345,481 | 7/1920 | Davis | 186/54 X |
| 3,008,591 | 11/1961 | Cantelmo | 186/52 X |
| 3,360,077 | 12/1967 | Horan | 186/52 |
| 3,447,699 | 6/1969 | Weir | 186/69 X |
| 3,945,467 | 3/1976 | Levitz | 186/35 |
| 4,137,984 | 2/1979 | Jennings et al. | 414/279 X |
| 4,466,765 | 8/1984 | Mautino | 414/277 |

FOREIGN PATENT DOCUMENTS 230943 5/1959 Australia ........................... 186/52
2202139 7/1973 Fed. Rep. of Germany ...... 414/281

Primary Examiner—Joseph J. Rolla
Assistant Examiner—Kevin P. Shaver
Attorney, Agent, or Firm—Bachman & LaPointe

[57] ABSTRACT

Installation for restocking merchandise in a self-service shop in tiers of shelves (11, 12, 16) which extend parallel to each other with alleys for customers to move along. The tiers of shelves (11, 12) are assembled in islands (10) with front faces (11a, 12a) accessible to customers in the alleys and rear faces (11b, 12b) defining a central supply space (1) which is inaccessible to the customers. Transfer openings (21) in the sales floor (A) in the central spaces (1) give access to a storage floor (B) where stocks of the merchandise are stored. Mobile lift trucks (4,5) enable merchandise to be picked from the storage floor and transferred to the central space (1) where it is placed on the sales shelving (11, 12) through its rear faces (11b, 12b).

8 Claims, 2 Drawing Figures

INSTALLATION AND METHOD FOR SUPPLYING MERCHANDISE TO SALES DISPLAY STRUCTURES

BACKGROUND OF THE INVENTION

This invention relates to an installation and method for supplying merchandise to sales shelving or similar sales display structures in self service distribution centers, such as stores, supermarkets and hypermarkets. More particularly, the invention is applicable to sales areas having at least one sales floor accessible to customers, on which the sales display structures extend parallel to each other in ranks and rows, leaving alleys between them for the movement of the customers.

DESCRIPTION OF THE PRIOR ART

In known supermarkets and hypermarkets, restocking merchandise on the sales shelving is usually performed from the same side as the merchandise is taken by the customer. All faces of the sales shelving are normally accessible to customers.

This principle of restocking presents certain disadvantages. For example, restocking the shelving is very difficult during shop opening hours and even is impossible at rush hours. These facts result in lost sales for the shop if certain shelves are empty for a while, and the image of the shop suffers both from the disappointment of the customer who cannot find what he was looking for and from the hindrance of supply trolley obstructing the alleys. Moreover, the fact of restocking shelving from the same side as the sales display implies that the merchandises placed last on the shelves are first to be sold, so that old dirty merchandise may stay months at the back of the shelves and become unsaleable, especially in the case of perishable goods. It is possible to avoid this latter disadvantage by emptying the shelving completely before restocking, so that older merchandise may be placed before the new, but this involves inconvenient and fastidious manipulations which often are impossible while customers are present.

Also, the supply of merchandise is usually performed from storage areas which are relatively remote from the point of sale. This is a further disadvantage, since the merchandise must be transported over a substantial distance from the storage outlet to the point of sale. Several areas of a large shop may be especially encumbered by successive supply trolleys going to and from different points of sale.

OBJECTS OF THE INVENTION

An object of the invention is to improve the restocking of merchandise on sales display structures in a self-service shop.

Another object of the invention is to reduce annoyance to customers caused by out of stock sales displays, or by movement of supply vehicles.

Yet another object of the invention is to provide a shop installation comprising display structures for displaying merchandise for sale, alleys for movement of customers around the display structures, and means for restocking the display structures without using the customer alleys.

Yet another object of the invention is to facilitate FIFO ("first in, first out") restocking of sales display structures.

Yet another object of the invention is to provide a short transit distance between storage areas and corresponding points of sale.

BRIEF DESCRIPTION OF THE INVENTION

One aspect of the invention provides an installation for a self-service shop, comprising at least one sales floor, at least one storage floor, said floors being disposed one above the other, display structures on said sales floor for displaying merchandise for sale, and display structures defining sales areas between them, and said display structures presenting front faces which are accessible for merchandise to be taken therefrom by customers in said sales areas, and rear faces which are inaccessible from said sales areas, said structures being restockable through said rear faces, at least one of said floors presenting transfer openings juxtaposed with said rear faces, said installation including transfer means for transferring merchandise from said storage floor to said sales floor through said transfer opening, whereby said display structures may be restocked through said rear faces.

Another aspect of the invention provides an installation for a self service shop comprising at least one sales floor, at least one storage floor below said sales floor, display structures on said sales floor for displaying merchandise for sale, said display structures defining sales areas between them, and said display structures presenting front faces which are accessible for merchandise to be taken therefrom by customers in said sales areas, and rear faces which are inaccessible from said sales areas, said display structures being restockable through said rear faces, said sales floor presenting transfer openings juxtaposed with said rear faces, said installation including transfer means for transferring merchandise from said storage floor to said sales floor through said transfer opening, whereby said display structures may be restocked through said rear faces, said transfer means being movable horizontally on said storage floor.

In this way, opposite faces of the display structures may be used, one for restocking and the other for sales.

Preferably, at least one of said display structures is an island accessible on all outer sides from said sales area, said rear faces defining a central space inside said structure in which said transfer opening is disposed, said central space being inaccessible from said sales area.

In a preferred embodiment, said transfer means includes a lift truck, said lift truck comprising a platform, means for passing said platform through said transfer opening and for retracting said platform, whereby to allow horizontal movement of said truck to another display structure.

The invention also includes a method of supplying merchandise from a storage floor to display structures on a sales floor of a self-service shop, said floors being disposed one above the other, said display structures defining sales areas between them, said display structures presenting front faces which are accessible for merchandise to be taken therefrom by customers in said sales areas and rear faces which are inaccessible from said sales areas, said method including picking said merchandise from said storage floor, utilising transfer means to transfer said merchandise from said storage floor through an opening in one of said floors juxtaposed with said rear face of the display structure, and placing said merchandise on said display structure through said rear face.

Yet another aspect of the invention includes a method of supplying merchandise from a storage floor to display structures on a sales floor of a shop, said sales floor being above said storage floor, and said display structures defining sales areas between them, at least one of said display structures being an island accessible on all outer sides from said sales areas, said method including picking said merchandise from said storage floor, loading the picked merchandise on a platform of a lift truck which is movably disposed on said storage floor, raising said platform to pass the merchandise thereon through a transfer opening in said sales floor in said central space of a chosen display structure, placing the merchandise from said platform onto said display structure through at least one of said rear faces, and subsequently lowering said platform.

It is also possible for a display structure to form only one side of a point of sale, the other side being against a wall for example, the rear face of the display structure being juxtaposed with a transfer opening communicating with the storage floor and inaccessible to customers, and the front face being accessible to customers in the sales area. The method of restocking is similar to that described above.

DESCRIPTION OF THE DRAWINGS

Other features and advantages of the invention will appear from the following description of a preferred embodiment thereof, given by way of example with reference to the accompanying drawing, in which.

DESCRIPTION OF THE EMBODIMENTS

Figure 1:
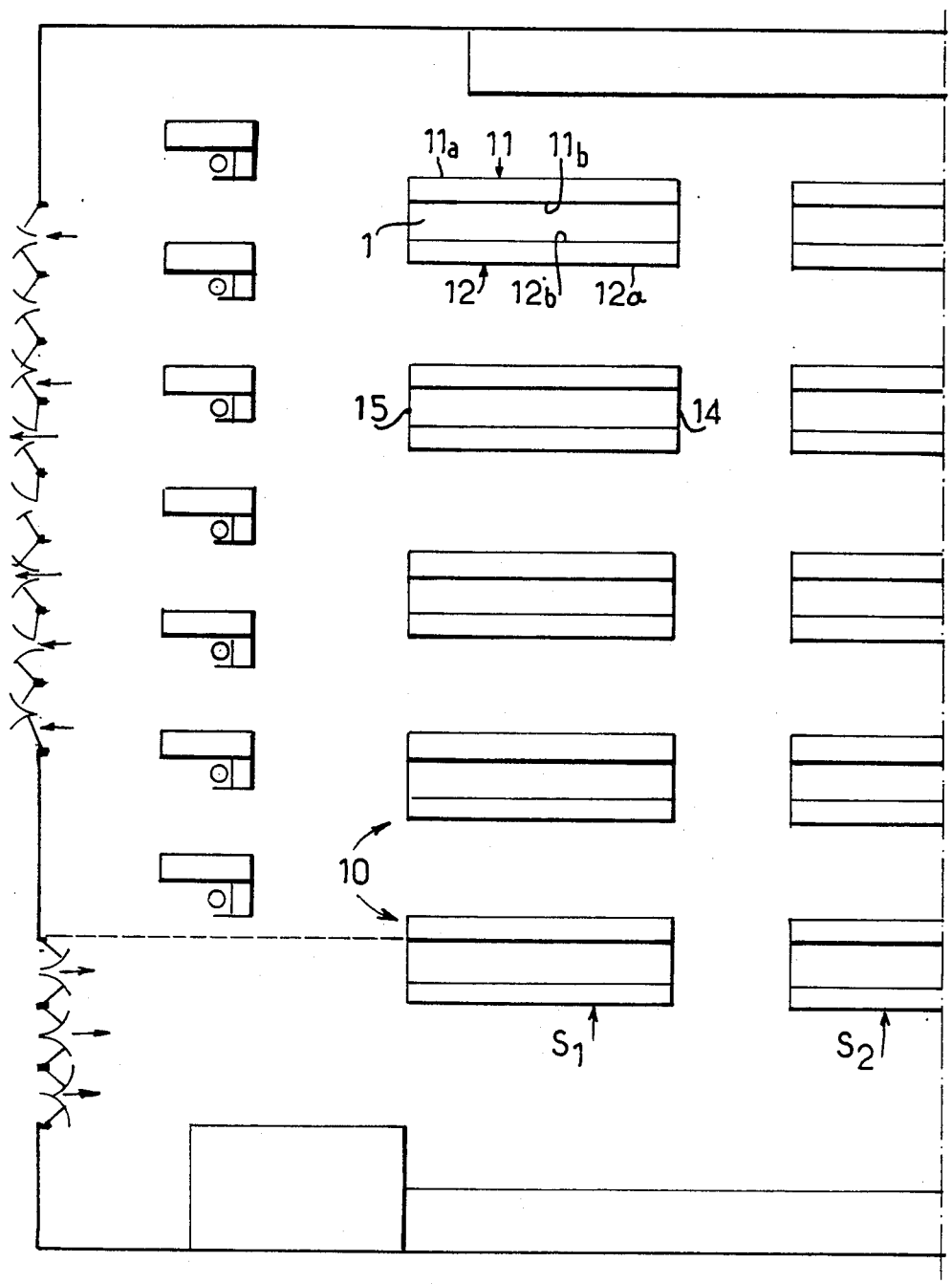
FIG. 1 is a plan view of a sales surface in accordance with the invention.

FIG. 1 shows the general arrangement of a large self-service store, in which the islands 10 for displaying merchandise extend parallel one to another in successive ranks such as S1, S2.

A line of cash desks are also provided, in known fashion, and a central cash desk and side shelves positioned against walls (for example for distributing fresh produce).

In this embodiment of the invention, each of the islands 10 comprises two parallel tiers of shelves 11 and 12 extending with a space 1 between them sufficient to enable the shelves to be restocked from inside the island. Moreover, the two ends of each island are preferably closed, so that the central space 1 is inaccessible to the public. Customers therefore have access, for each tier of shelves 11, 12, to the outer sales faces 11a, 12a. On the other hand, they cannot take merchandise from the inner restocking faces 11b, 12b.

The ends 14, 15 of each island can be formed by simple closure walls, or may also present tiers of shelves, merchandise paniers, or other means for displaying goods for sale.

Figure 2:
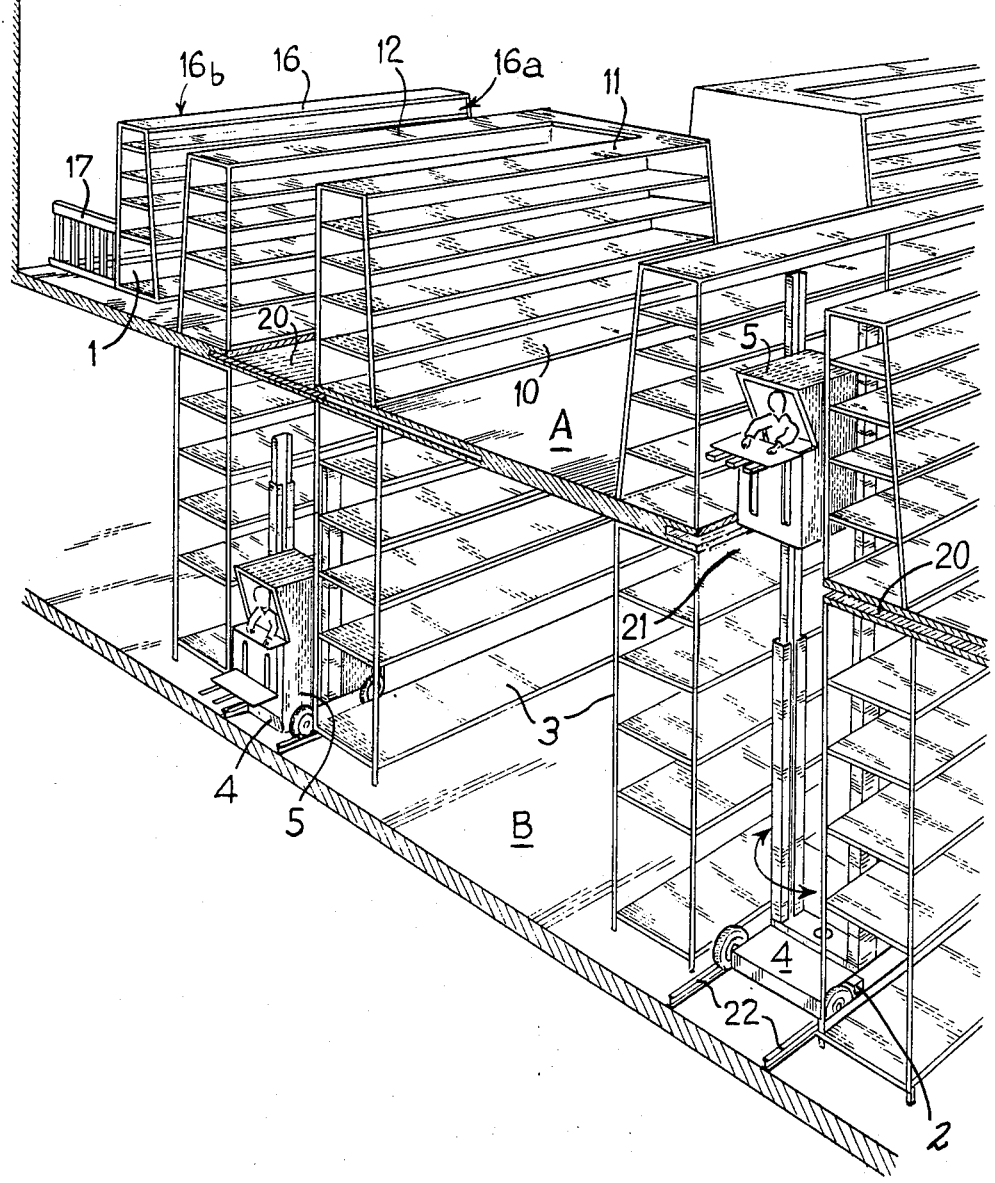
FIG. 2 is a perspective view, partly in section, of different devices and aspects of a supply installation in accordance with the invention.

FIG. 2 is a more detailed illustration of the installation, and shows the utilisation of the supply spaces 1.

The installation comprises at least one upper sales level A, corresponding to the floor shown in FIG. 1, and at least one lower storage level B for storing merchandise which is not displayed for sale.

The storage level B comprises storage shelving 3, which is aligned vertically with the shelves 11, 12 of the sales islands 10 on the sales floor A. These storage shelves 3 therefore present between them substantially the same central supply space 1 as the islands 10. Each supply space 1 extends therefore in three dimensions as a volume defined:

vertically by the addition of the tiers of storage shelves 3 and the tiers of sales shelves 11, 12;
lengthwise by the length of the sales shelves 11, 12;
widthwise by the width of mobile elevator supply means 4 enabling the transport of merchandise between the lower storage level B and the upper sales level A.

In the embodiment illustrated, the mobile elevator means comprise at least one automobile lift truck of the "picking" kind, whose lift platform moves between at least two positions:

a lower position in which the overall height of the lift truck is lower than the ceiling height of the storage level B;

a raised position in which the platform is brought substantially to the level of the shelving at the sales level A; the lift truck can drive from one island to another when the platform is in its lower position.

The lift trucks 4 with a lifting cabin 5 enables merchandise to be picked by an operator in the cabin from the storage shelving 3, and then the cabin to be raised for the operator to place the merchandise in the sales shelving 11, 12 on both sides. Merchandise can also be taken in the opposite direction. In these operations, the cabin 5 of the lift truck passes, by simple elevation, from the storage level B to the sales level A inside the central supply space 1 and can move forwards and backwards in the raised position along the whole length of the supply space 1, between the two tiers of sales shelves 11, 12.

On the other hand, when the cabin 5 of the lift truck is in its lowered position, it can drive to any desired part of the storage area.

This arrangement gives an improvement in productivity, and much more convenient conditions for handling merchandise. Restocking sales shelves can be performed at any desired moment, and restocking by the "rear" faces of the sales shelves 11, 12 favours sale first of the merchandise first displayed for sale (FIFO).

It should be noted that rear arrangement of shelves can be prepared by the operators in advance without it being first necessary to empty the shelving to prepare the displays.

It should also be noted that the mobile elevator means could also be formed by displaced hoists; the storage shelving 3 can also be disposed in positioning which is dissimilar to that shown in FIG. 2, and in particular could be different from the sales shelves.

In a simplified embodiment, sales shelving 16 may be provided on one side only of a supply space 1, the other side being a wall of the building for example. The tier of shelves 16 presents a sales face 16a, which is accessible to customers, and a supply face 16b, inaccessible to customers and facing the supply space 1. A barrier 17 or other obstacle forms a protection for people by preventing access to the supply opening 1.

In another version, the barrier 17 may be replaced by shelving or other means for displaying merchandise.

Safety devices may be provided in the installation:
fire panels 20 may be provided for closing the transfer opening 21 in the sales floor A in the central supply space 1. These panels 20 are mounted slidingly parallel to the floor A between the floor and the storage shelving 3.

the shelves 11, 12 naturally serve as protection relative to the supply opening 1, due to their limited spacing.

in places where palettised containers are to be placed, parapets can be disposed in front of the container positions, like balcony parapets, to prevent children approaching the supply opening 1.

Tactile and/or optical systems 2 for detecting obstacles to the movement of the lift truck platform 5 may be disposed within the supply space 1, or on the cabin 5 of the lift truck, so as to halt movement or lifting if merchandise projects from the shelving. These systems also enable security to be reinforced in case, in spite of all the precautions taken, a person managed to pass his hand or other member into the central supply space 1.

In an advantageous embodiment of the invention, stop switches prevent the cabin 5 being driven forwards or backwards while raised beyond the limits of the supply opening 1.

Additionally, guide rails 22 may advantageously be provided on the storage floor B, aligned with the transfer openings 21, so as to centre the lift truck in the openings 21.

The method of supplying merchandise to the sales shelving using the installation described above is as follows:

an operator on the lowered platform 5 of the lift truck 4 picks merchandise stored in the storage shelving at the storage level B beneath the sales floor A;

the lift truck 4 is brought into alignment vertically below a transfer opening 21 formed in the ceiling of the storage level B and opening into the supply space behind the desired sales shelving 11, 12, 16;

the loaded platform 5 is raised through the opening 21 until it is positioned at the height of the supply face 11b, 12b, 16b of the sales shelving on the sales floor A;

merchandise from the platform is placed onto the sales shelving 11, 12, 16 according to the "first in, first out" (FIFO) method.

the platform 5 is lowered, so that the lift truck can move to another transfer opening.

When the islands 10 present two parallel tiers of shelving 11, 12, the method is as follows:

merchandise is picked and loaded onto the lowered platform 5.

the lift truck is driven to a position beneath one of the central supply spaces 1;

the platform is raised through the opening 21 into the supply space 1 between the shelving 11, 12 and the merchandise is placed in one or both tiers of shelving through the supply faces 11b, 12b;

the platform is lowered to enable the lift truck to move to another position.

It will be appreciated that the installation in accordance with the invention may comprise more than one sales floor and more than one storage floor.

Moreover, in a variant; the storage floor or floors may be disposed above the sales floor; however in the preferred arrangement the storage floor is beneath the sales floor, as shown in the drawings.

I claim:

1. An installation for a self-service shop, comprising at least one sales floor, at least one storage floor, said floors being disposed one above the other, display structures on said sales floor for displaying merchandise for sale, said display structures defining sale areas between them, and said display structures presenting front faces which are accessible for merchandise to be taken therefrom by customers in said sales areas and rear faces which are inaccessible from said sales areas, said structures being restockable through said rear faces, at least one of said floors presenting transfer openings juxtaposed with said rear faces, said installation including transfer means for transferring merchandise from said storage floor to said sales floor through said transfer opening, whereby said display structures may be restocked through said rear faces, wherein said transfer means comprises a platform and motive means for passing said platform through said transfer opening, retracting said platform back through said transfer opening and moving said platform horizontally from display structure to display structure.

2. An installation as claimed in claim 1 wherein at least one of said display structures is an island accessible on all outer sides from said sales area, said rear faces defining a central space inside said structure in which said transfer opening is disposed, said central space being inaccessible from said sales area.

3. An installation as claimed in claim 1 and including detector means for detecting obstacles to movement of said platform.

4. An installation as claimed in claim 1 and including storage structures on said storage floor which are substantially aligned with display structures on said sales floor.

5. An installation as claimed in claim 1 and including a fire panel mounted slidingly for closing said transfer opening in the event of a fire.

6. An installation as claimed in claim 1 wherein said transfer means includes a lift truck, and said lift truck has said platform thereon.

7. An installation as claimed in claim 6 and including guide rails for aligning said lift truck with said transfer opening.

8. A method of supplying merchandise from a storage floor to display structures on a sales floor of a self-service shop, said floors being disposed one above the other, said display structures defining sale areas between them, and said display structures presenting front faces which are accessible for merchandise to be taken therefrom by customers in said sales areas and rear faces which are inaccessible from said sales areas, said method including picking said merchandise from said storage floor, utilizing transfer means to transfer said merchandise from said storage floor through an opening in one of said floors juxtaposed with said rear face of the display structure, placing said merchandise on a display structure through said rear face and retracting said transfer means through said opening and moving said transfer means horizontally and thereafter vertically through said opening to another display structure.

* * * * *